United States Patent [19]

Logue

[11] Patent Number: 5,318,133

[45] Date of Patent: Jun. 7, 1994

[54] GRAIN DRILL DISK SCRAPER ASSEMBLY

[75] Inventor: Robert W. Logue, Bolingbrook, Ill.

[73] Assignee: Case Corporation, Racine, Wis.

[21] Appl. No.: 983,818

[22] Filed: Dec. 1, 1992

[51] Int. Cl.⁵ ............................................. A01B 15/16
[52] U.S. Cl. .................................. 172/560; 172/563; 111/164
[58] Field of Search ............... 172/558, 560, 561, 563, 172/220, 564; 111/164

[56] References Cited

U.S. PATENT DOCUMENTS

| | | | |
|---|---|---|---|
| 733,593 | 7/1903 | Poirier | 172/560 |
| 744,711 | 11/1903 | Bills | 172/560 |
| 747,759 | 12/1903 | Packham | 172/560 |
| 1,018,220 | 2/1912 | Van Brunt | 172/560 |
| 1,113,776 | 10/1914 | Goetz | 172/560 |
| 1,410,883 | 3/1922 | Bozard | 172/560 |
| 2,540,262 | 2/1951 | Higginson | 172/560 |
| 4,337,835 | 7/1982 | Steilen | 172/560 |
| 4,736,803 | 4/1988 | Roush | 172/560 |
| 5,060,586 | 10/1991 | Hoyt | 111/164 |

Primary Examiner—Clifford D. Crowder
Assistant Examiner—Michael A. Neas
Attorney, Agent, or Firm—Rudnick & Wolfe

[57] ABSTRACT

A disk scraper assembly for a furrow opener including a pair of closely spaced disks rotatably mounted on a support in downwardly converging relation relative to each other. The scraper assembly includes a pair of scraper blades supported for lateral-sliding movement independently of and in opposite directions relative to each other between the disks of the furrow opener. Each blade has a generally planar configuration and includes an elongated scraper surface which is adjustably fitted and then fixedly held in place to scrape dirt from an inner face of one of the disks.

3 Claims, 2 Drawing Sheets

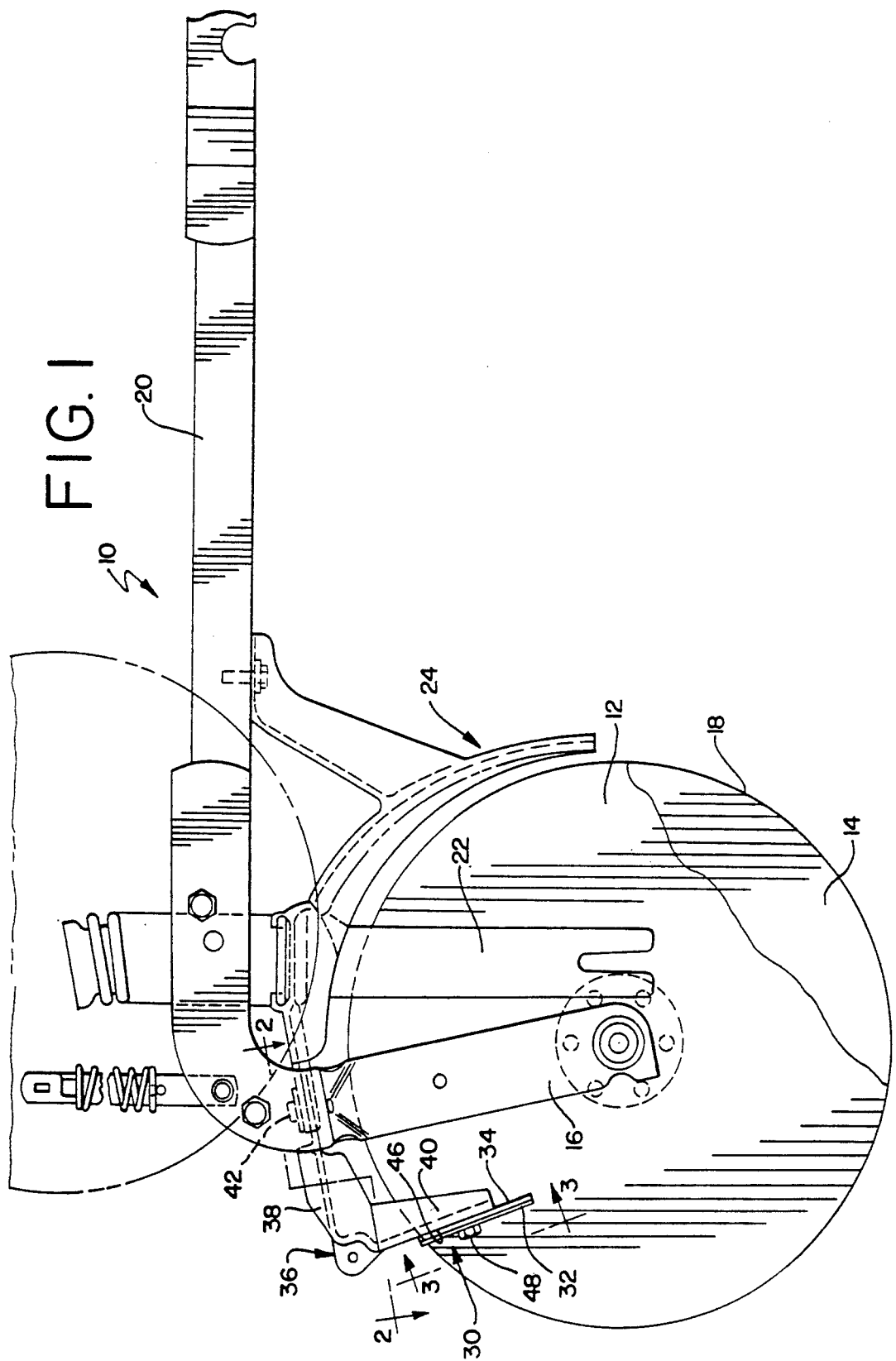

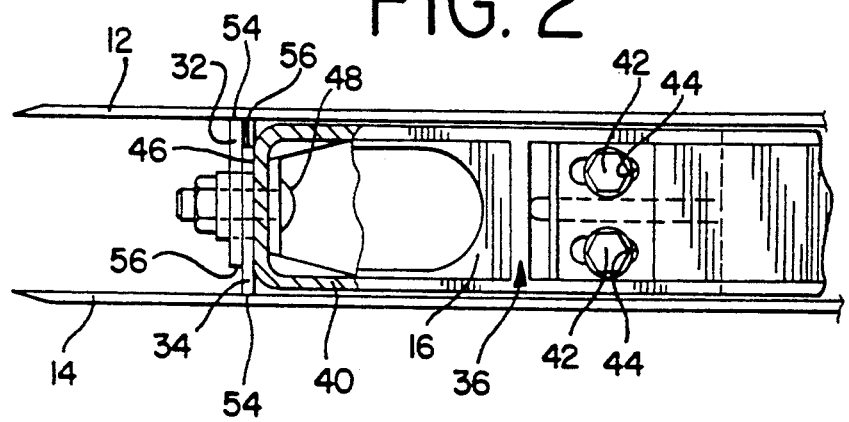
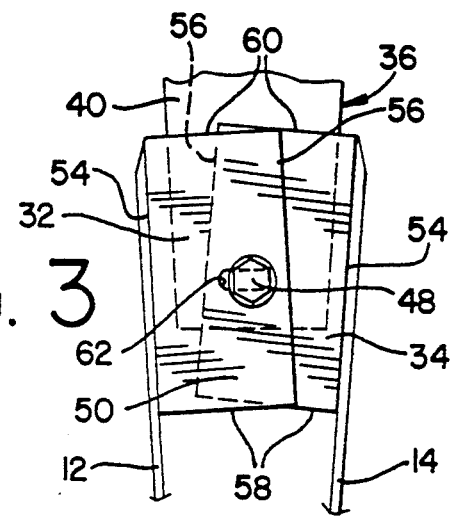
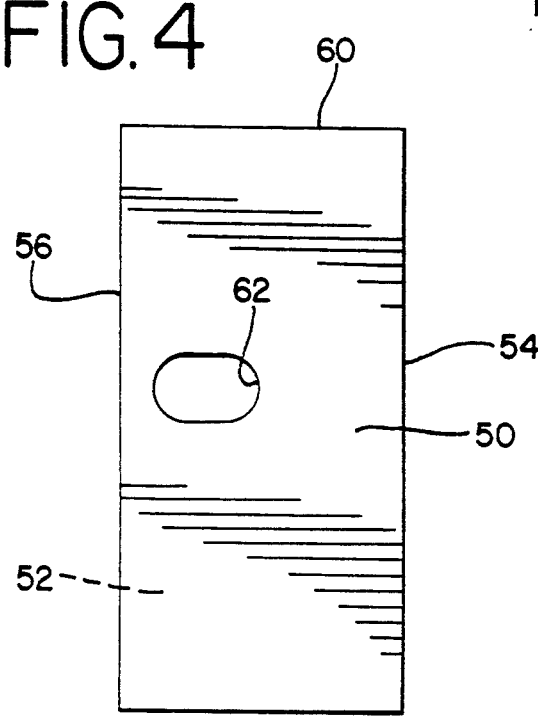
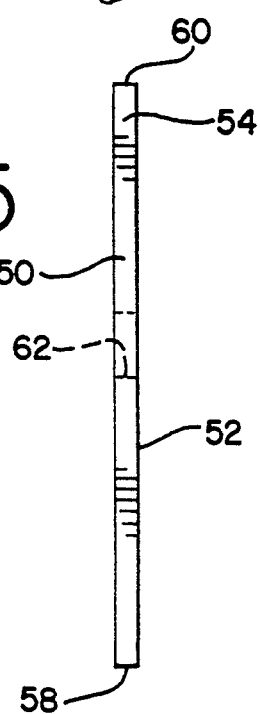

GRAIN DRILL DISK SCRAPER ASSEMBLY

FIELD OF THE INVENTION

The present invention generally relates to agricultural planting equipment and, more particularly, to an assembly for scraping dirt and debris from inner disk faces on planting equipment such as grain drills, and the like.

BACKGROUND OF THE INVENTION

Conventional furrow openers and grain drills typically include two round and flat steel disks mounted to a drawbar for the purposes of creating a seedbed. Double disk furrow openers and grain drills are either of a conventional design or a min-till design. The double disks on a furrow opener of a conventional design downwardly converge relative to each other to establish a common pinch point or area toward a forward end thereof. While downwardly conveying toward each other, the double disks on a furrow opener of a min-till design are mounted in a fore-and-aft staggered relation relative to each other and have a different angular orientation relative to each other than are the disks of a furrow opener of a conventional design. The min-till design of grain drill is typically used when less soil preparation has been done and for soil conservation purposes.

A variety of soil consistencies may be encountered during a planting operation. Under certain conditions, dirt, mud, trash, and the like tends to cling or adhere to the inside faces of the disk. Removing soil clinging to the inside surfaces of the disks is particularly difficult in heavy clay soil and most difficult when planting is done when such soil is wet. With the enhanced mechanization of farming operations and the increased speed at which the implements are drawn across a field, this problem has become acute and, in many types of soil, has rendered the use of double disk furrow openers virtually impractical.

Accumulations of dirt can stop the turning of the disks, which renders them ineffective for proper opening of furrows for seeding. Improper or uneven removal of clods of soil from between the disks can cause other problems, such as uneven planting depths. The disk cleaning problem is further aggravated in those grain drill furrow openers wherein the disks are poorly manufactured and have other than a completely flat surface across the entirety thereof. The angular differences between disks used on a conventional grain drill and those used on a min-till furrow opener further complicates the problem of removing accumulated dirt from between the disks.

Different scraper designs have been proposed for removing dirt accumulations from inner faces of the disk. Some of the scraper designs, however, fail under heavy stripping requirements. Moreover, the heretofore known scraper designs are not typically interchangeable between conventional and min-till type furrow openers. Accordingly, a farmer is burdened by having to keep a parts inventory for those scrapers used on conventional type furrow openers plus a scraper parts inventory for the min-till type furrow openers.

Misadjustment in centering the heretofore known scrapers between the disks of the furrow openers presents another problem. As will be appreciated, a centering misadjustment of the scrapers between the double disks often causes a scraper to wipe or clean one disk more effectively than the cleaning action offered to the other disk. The need to exactly center the scraper mechanism between the disks of the furrow opener, of course, adds time and expense to repair and maintenance procedures.

Other scraper designs include a pair of scraper blades resiliently biased outwardly under the influence of a spring so as to offer a self-adjusting capability for the scraper. Resiliently urging the scraper blades against the inner surface of the disks advantageously solves the misalignment problem of heretofore known scraper designs by allowing the scraper blades to "float". Constant contact of the scraper blades against the inner faces of the furrow opener disks, however, causes wear and noise problems on many of the scraper designs. The addition of the spring element to such a scraper design furthermore adds cost to the assembly.

Thus, there is a need and a desire for a furrow opener scraper assembly which is consistent and reliable in moist, heavy clay soil conditions and yet is economical to manufacture and easy to install and service on both conventional and min-till furrow opener designs.

SUMMARY OF THE INVENTION

In view of the above and accordance with the present invention, there is provided a scraper assembly for a grain drill furrow opener including a pair of closely spaced rotational disks which downwardly converge toward each other. The scraper assembly includes a pair of scraper blades and an assembly for mounting scraper blades between the disks of the furrow opener. The scraper blades are supported for lateral sliding movement relative to and in opposite directions from each other between the disks. Each scraper blade has a generally planar configuration and includes an elongated scraper surface for scraping dirt from an inner face of one of the disks. The mounting assembly allows for the scraper surface of each scraper blade to be independently and horizontally adjusted relative to a respective disk and for securing the blades in place whereafter the blades are held stationary relative to the disks.

The mounting assembly includes a scraper mounting connected to a support on which the opener disks are rotatably mounted. The scraper mounting includes an elongated arm to which the scraper blades are connected and an adjustable mechanism for facilitating centering of the arm between the disks of the furrow opening. In a preferred form of the invention, the mounting assembly further includes a threaded fastener for conjointly and releasably clamping the scraper blades to the scraper mounting.

In a most preferred form of the invention, the threaded fastener passes through a laterally elongated slot defined by each scraper blade whereby allowing the scraper surface of each blade to be independently and horizontally adjusted relative to an inner face of a respective disk and for securing the blades in place whereafter the blades are held stationary relative to the disks. Each scraper blade defines inner and outer edges with side edges which preferably extend generally parallel to each other for facilitating assembly of the scraper assembly. In one form of the invention, the scraper blades are secured to the mounting assembly such that an outer edge of the scraper blade extends to a peripheral edge of at least one of the disks on the furrow opener.

Each of the scraper blades is rigidly constructed thus providing sturdiness and strength to the scraper assembly while the flat and generally planar configuration of the blades readily allows for their economic manufacture. The independent adjustability of the scraper blades allows them to be readily adapted to changes in angular configuration between the disks of the furrow opener. Therefore, the scraper assembly of the present invention is readily and equally adaptable to furrow openers of either a conventional design or of a min-till design. Moreover, the present invention allows the scraper blades of the assembly to be adjusted in close proximity and without necessarily contacting the inner surfaces of the disks of the furrow opener. Thus, the scraper blades can be horizontally adjusted to accommodate manufacturing imperfections in the disk of the furrow openers thus eliminating noise generating contact with the disks during a planting operation.

Numerous other features and advantages of the present invention will become readily apparent from the following detailed description, the accompanying drawings, and the appended claims.

BRIEF DESCRIPTION OF THE DRAWINGS

FIG. 1 is a side elevation of a double disk grain drill assembly with one of the disks being broken away and incorporating the structure of the present invention;

FIG. 2 is a sectional view taken along line 2—2 of FIG. 1;

FIG. 3 is a sectional view taken along line 3—3 of FIG. 1;

FIG. 4 is an elevational view of a scraper blade forming part of the present invention; and FIG. 5 is a side elevational view of the scraper blade illustrated in FIG. 4.

DETAILED DESCRIPTION OF THE PRESENT INVENTION

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, there is schematically illustrated a furrow opener unit 10 which is exemplary of one in a series of opener units that are arranged on a seed dispenser implement such as a grain drill. The furrow opener unit 10 includes a pair of closely spaced annular disks 12 and 14 which are rotatably supported about a fixed axis by a vertical support 16, at least a portion of which extends between the disks 12, 14. Disks 12, 14 of unit 10 converge in a downward direction relative to each other.

Unit 10 illustrated in the drawings embodies a conventional design wherein the disks 12, 14 contact each other forwardly of the axis of disk rotation in an area or location and generally designated by reference numeral 18. As will be appreciated, the disk contact facilitates penetration of the earth and opens a furrow therein for the deposit of seed or the like. Alternatively, the disks 12, 14 of unit 10 can be mounted in a min-till design without detracting from the spirit and scope of the present invention.

Vertical support 16 is part of a row unit casting 20 connected at a forward end to a drawbar (not shown).

In the illustrated embodiment, a seed tube 22 extends downwardly between each double disk 12, 14 arrangement. Tube 22 depends from suitable support structure (not shown) and opens rearwardly of the disk contact area 18. As is conventional, tube 22 serves to convey seeds by gravity feed to the bottom of a furrow which is opened by the disks 12, 14 of unit 10.

In a preferred form of the invention, a hood assembly 24 covers an upper and forward portion of the opener unit 10. Hood assembly 24 inhibits dirt and other trash thrown up by other parts of the machine during the travel thereof across a field from dropping between the disks 12, 14 of opening unit 10.

As the unit 10 passes or rolls over the ground, the disks 12, 14 tend to accumulate dirt on the outer and inner faces thereof. Particularly when the soil is moist, and due to the rotation of the disks, the dirt is carried with the disks 12, 14 and would interfere with seeding and proper operation if not removed. Therefore, a disk scraper assembly 30 is provided for each opener unit 10 to prevent dirt entrapped between the disks 12, 14 from being carried up over the top of the disks thereby preventing dirt accumulations from interfering with proper seeding operations.

Disk scraper assembly 30 includes a pair of scraper blades 32, 34 which are releasably secured to support 16, in a manner which will be described hereinafter, in a position between the double disk of the opener unit 10 and on an opposite side of the axis of rotation of the disks 12, 14 from tube 22. Scraper blade 32 is arranged in a predetermined scraping relation with the inner face of disk 12 while scraper blade 34 is arranged in a predetermined scraping relation with the inner face of disk 14. As will be appreciated from an understanding of a present invention, the scraper blades 32, 34 serve to scrape dirt from the disks 12, 14 as they turn during the planting operation.

The scraper assembly 30 further includes a scraper mounting 36 which extends at least partially between the disks 12, 14 and is connected to the support 16. In the illustrated embodiment, scraper mounting 36 includes first and second angular offset arm portions 38 and 40, respectively. As shown in FIGS. 1 and 2, arm portion 38 of mounting 36 is secured to support 16 as with threaded fasteners 42.

Preferably, arm portion 38 is provided with oversized slots or openings 44 through which the fasteners 42 extend to secure mounting 36 to support 16. As will be appreciated, the combination of releasable fasteners 42 and the oversized openings 44 allows the mounting 36 and, more particularly, arm portion 40 to be adjusted and, thus, centered between the disks 12, 14.

Arm portion 40 angles away from arm portion 38 and extends toward the rotational axis of disks 12, 14. As shown, arm portion 40 has a generally planar or flat mounting surface 46 to which the scraper blades are releasably clamped.

The scraper blades 32, 34 are carried by arm portion 40 of mounting 36 so as to allow the blades 32, 34 to be: initially and independently adjusted in a horizontal direction relative to each other and relative to the inner face of a respective disk; and then subsequently clamped in place to prevent further relative movement between the scraper blades 32, 34 and the disks 12, 14, respectively. In the illustrated embodiment, a threaded fastener 48 serves to releasably and conjointly clamp scraper blades 32, 34 to mounting 36.

As shown in FIGS. 3 through 5, the scraper blades 32, 34 are substantially identical in structure and are preferably formed of a rigid material such as abrasion-resistant cast iron or the like. As shown, each scraper blade 32, 34 has generally planar or flat major surfaces 50, 52 extending between laterally spaced and elongated side edges 54 and 56 and inner and outer edges 58 and 60, respectively. In the illustrated embodiment, the side edges 54, 56 extend generally parallel to each other to facilitate assembly of the blades 32, 34 to the scraper mounting 36. As best shown in FIGS. 4 and 5, each blade defines an offset laterally elongated slot 62 extending through each blade and between the side edges 54 and 56 thereof. In the illustrated embodiment, slot 62 extends generally horizontally across each blade. It should be appreciated, however, that the slot 62 can be horizontally slanted as long as it allows a horizontal component of movement to the respective blade when secured to mounting 36.

When the blades 32, 34 are assembled, the respective slot 62 of the blades are in general registry so as to allow the fastener 48 to pass therethrough. As will be appreciated, the confines of the slot 62 supports each blade on the fastener 48 and guides the blade for generally horizontal movement toward and away from an inner face of a respective disk of the opener unit 10.

As shown in FIGS. 4 and 5, slot 62 is preferably offset laterally and lengthwise of a scraper blade. The lateral offset facilitates a common design for the blade relative to and on either side of the scraper assembly. As shown in FIG. 3, the lengthwise offset of slot 62 allows the outer edge 60 of each blade to extend to a peripheral edge of at least one of said disks 121, 14 of the opener unit 10.

The disk scraper assembly 30 is preferably mounted in diametrically opposed relation to the location or area 18 whereat the disks 12, 14 contact with each other. In such position, accumulated dirt and debris is wiped from an inner face of the rotating disks 12, 14 rearwardly of the seed tube 22 to effectively keep dirt and debris from traveling up and over the top of the disks and from becoming lodged between the hood assembly 24 and the disks, thus allowing for efficient operation of the opener unit.

Prior to being clamped and secured in place, a side edge of each blade is initially adjusted relative to an inner face relative to a respective opener disk. Of course, providing for independent lateral adjustment of each scraper blade allows for a customized fit between the blade and a respective disk. Furthermore, allowing for independent adjustment of the scraper blades 32, 34 enhances the versatility of the scraper assembly such that it may be used with either a conventional design opener or a min-till opener unit. Thus, the farmer is provided with a universal scraper assembly in that it is usable on opener units of either a conventional or min-till design.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

What is claimed is:

1. A disk scraper assembly for a furrow opener including first and second transversely spaced disks mounted on a support for rotation about an axis and such that the disks downwardly converge relative to each other, said disk scraper assembly comprising:

a scraper mounting including a blade mounting portion extending between and toward the rotational axis of said disks and an attachment portion which is releasably secured to said support to allow the blade mounting portion to be transversely centered between said disks;

a first slotted scraper blade carried by the blade mounting portion of said scraper mounting and extending laterally toward an inner surface of the first disk for scraping dirt therefrom, said first scraper blade having a generally planar configuration including laterally spaced side edges with a transversely elongated slot therebetween, said slot being spaced a predetermined distance from an upper edge of the first scraper blade;

a second slotted scraper blade carried by the blade mounting portion of said scraper mounting in partial overlying relation relative to said first scraper blade and extending laterally toward an inner surface of the second disk for scraping dirt therefrom, said second scraper blade having a generally planar configuration including laterally spaced side edges with a transversely elongated slot therebetween, said slot being spaced said predetermined distance from an upper edge of the second scraper blade; and a fastener for releasably clamping both scraper blades to the blade mounting portion of the scraper mounting, said fastener passing through overlying slots in said blades such that upper edges of the blades are arranged closely adjacent to the periphery of the disks and allows for independent adjustment of a side edge of each scraper blade relative and generally parallel to an inner surface of a respective disk and subsequent clamping of the blades to the mounting portion of the scraper mounting to prevent further relative movement between the edges of the scraper blades and the disks.

2. A disk scraper assembly for a grain drill including a pair of transversely spaced disks mounted on a support for rotation about an axis and such that the disks converge downwardly toward each other and contact at a location on one side of the rotational axis, said grain drill further including a seed tube extending substantially vertically between said disks and opening rearwardly of the location whereat the disks contact, said scraper assembly comprising:

a scraper mounting including a blade mounting portion extending between said disks and an attachment portion extending generally normal to said blade mounting portion and which is releasably attached to said support to allow said blade mounting portion to be transversely centered between said disks;

a pair of substantially identical rigid scraper blades carried in partial overlying relation relative to each other by the blade mounting portion of said scraper mounting on an opposite side of the rotational axis of the disks in generally diametrically opposed relation to the location whereat the disks contact with each other and such that the scraper blades extend laterally toward inner surfaces of said discs for removing dirt therefrom, each scraper blade having generally flat major surfaces with laterally spaced sides, each blade further including a transversely elongated slot wholly defined between the side edges of said blades a predetermined distance from an upper edge of the blade; and a fastener for releasably securing the scraper blades to the blade mounting portion of the scraper mounting with the elongated slots in the blades being arranged in general registry with one another, said fastener passing through said slots in said blades such that the upper edges of the blades are arranged proximate to the periphery of the disks and allows for independent adjustment of the side edges of each blade relative and generally parallel to an inner surface of a respective disk followed by securement of said blades to the mounting portion of the scraper mounting such that said scraper blades are fixed in place relative to the disks.

3. The scraper assembly according to claim 2 wherein the laterally, spaced side edges of each scraper blade extend generally parallel to each other to facilitate assembly of the blades to the scraper mounting.

* * * * *